United States Patent [19]

Cukelj

[11] Patent Number: 4,598,480
[45] Date of Patent: Jul. 8, 1986

[54] MULTI-POSITION STOP-GAUGE

[76] Inventor: Mirko Cukelj, 11459 Chapin St., Chesterland, Ohio 44026

[21] Appl. No.: 794,690

[22] Filed: Nov. 4, 1985

[51] Int. Cl.⁴ .............................................. G01B 5/20
[52] U.S. Cl. .................................................. 33/169 R
[58] Field of Search ............. 33/169 R, 169 C, 172 D

[56] References Cited

U.S. PATENT DOCUMENTS

| 2,412,870 | 12/1946 | Champlin | 33/169 R |
|---|---|---|---|
| 2,611,968 | 9/1952 | Brown, Jr. | 33/169 R |
| 3,319,339 | 5/1967 | Marconi | 33/169 R |
| 3,528,178 | 9/1970 | Kunzler | 33/169 R |
| 3,800,422 | 4/1974 | Schiler | 33/169 R |
| 3,810,311 | 5/1974 | Pingel | 33/169 R |
| 4,343,092 | 8/1982 | Wahl et al. | 33/169 R |

FOREIGN PATENT DOCUMENTS

| 271549 | 9/1912 | Fed. Rep. of Germany | 33/169 R |
|---|---|---|---|
| 2907474 | 8/1980 | Fed. Rep. of Germany | 33/169 R |

Primary Examiner—Willis Little
Attorney, Agent, or Firm—Frank B. Robb

[57] ABSTRACT

A stop gauge having a post to support a block rotatable to disengage locking parts and moveable on the post to various locked positions, together with an indicating arm similarly engaging the block and rotatable in the block to engage and disengage similar locking parts after movement to different positions, an indicating head at the end of the arm to engage a work piece for determining the position of such workpiece on a machine tool table for example.

8 Claims, 3 Drawing Figures

U.S. Patent  Jul. 8, 1986  4,598,480 ial patent number 4,598,480

MULTI-POSITION STOP-GAUGE

BACKGROUND OF THE DISCLOSURE AND DESCRIPTION THEREOF

The concept of this invention resides in the provision of a multi-position stop-gauge which includes the usual post and clamping block thereon together with an indicating arm extending from the block adapted to carry at its end a suitable indicating head for contact with a workpiece, the entire device being supported on a suitable base and in turn removably connected to a machine tool table or the like.

The important aspects of this disclosure are the fact that the clamping block is provided with unique locking means for both the connection of the block and the post as well as the connection of the indicating arm and the block, these being substantially identical and intended to provide positive positioning of the respective parts with regard to one another.

As far as I have been able to ascertain there is nothing in the prior art which involves the various locking and interlocking elements and means which are provided in this invention and thus it would appear that there is a substantial improvement offered hereby, residing primarily in the fact that in certain positions substantial movement is possible with regard to a post by the clamping block as well as the indicating arm and in other positions the same are locked positively with regard to one another and thus minimize the possibility of changes which might affect certain machining operations which were in the first place determined by this particular device.

With the foregoing in mind then a complete description of the invention is appended hereto and shown in the drawing wherein:

FIG. 1 is a perspective view, partly fragmentary, showing a suitable machine table with the device of this invention supported thereon and thereabove with the respective parts of the device in operative position. Certain of the parts are shown in phantom condition in another position in this same view and they are in that position to illustrate the ease of movement of the parts with regard to one another.

FIG. 2 is a fragmentary view showing the interengagement of the clamping block with a post, the same type of interengagement being provided for the arm and in unlocked position.

FIG. 3. is a view similar to FIG. 2, partly fragmentary and showing the parts in what may be termed their fixed or locked condition.

DETAILED DESCRIPTION OF THE INVENTION

Figure 1:
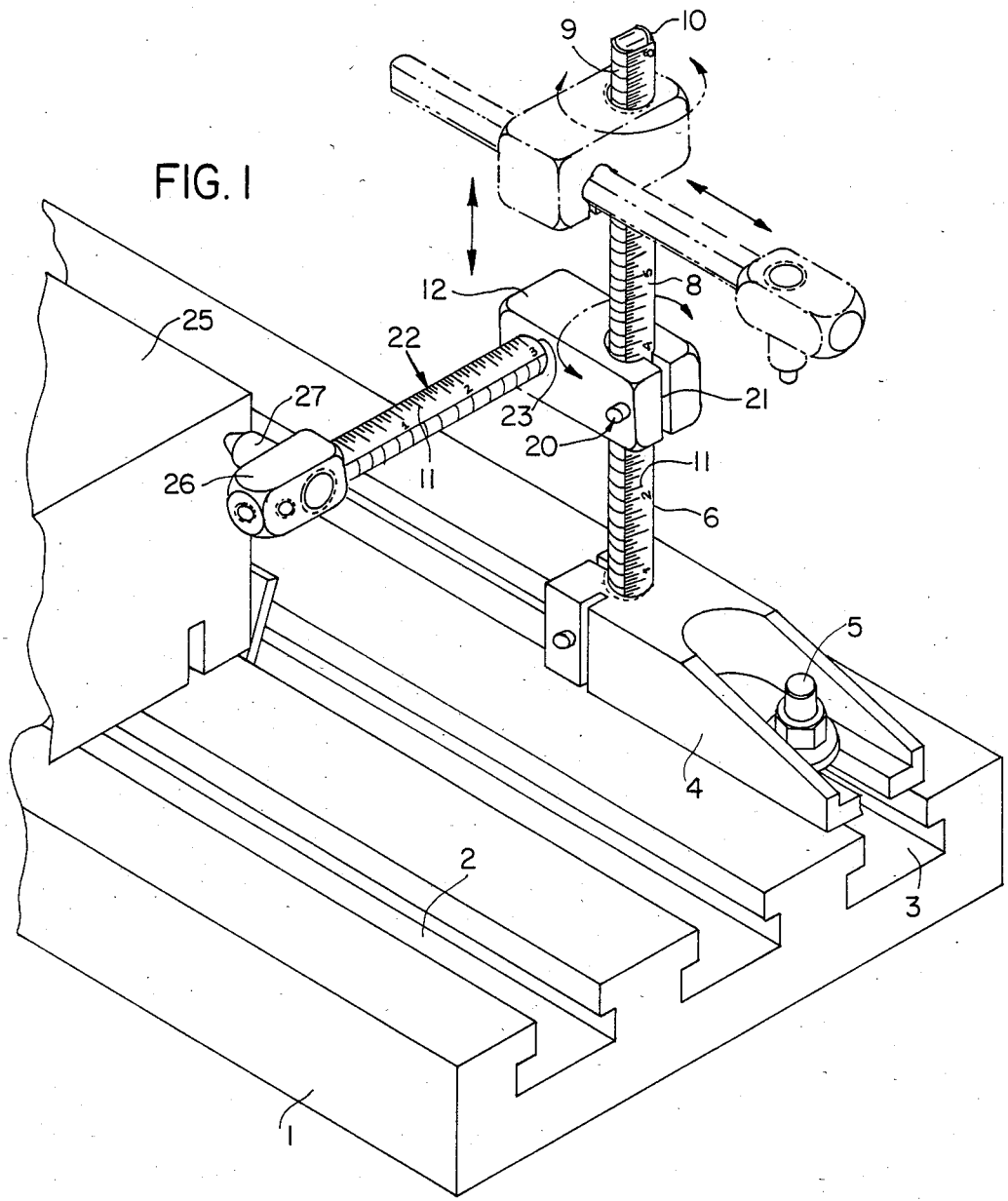

FIG. 1 shows a typical machine tool table designated 1 as having the usual machined grooves such as 2 and 3 therein, these being provided so as to in turn facilitate the positioning of a base such as designated 4 in this instance by means of a suitable nut and bolt arrangement 5 so as to fix the base with regard to the groove and prevent movement after the initial tightening action of the nut and bolt 5 has been effected.

Figures 2, 3:
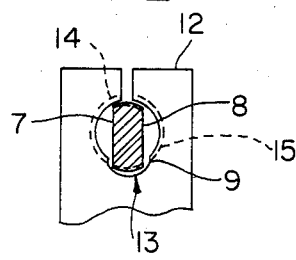

Extending upwardly from the base 4 is a post 6 of a particular formation to effectuate the end sought by this invention, specifically the post 6 is provided with opposed flattend areas such as designated at 7 and 8 in FIGS. 2 and 3 and in addition is provided with a ridge formation designated 9 at one side and 10 at the other side or opposed diametrically on the post 6, the configuration being suitable illustrated as well in FIGS. 2 and 3.

One of the flattened surfaces 8 for example may have suitable indicia thereon to indicate the position of the clamping block next to be described. The indicia are designated as 11.

The clamping block now to be described and designated 12 is provided with an opening therethrough generally denoted 13, which opening is peculiarly formed in that the certain areas are provided with grooves which will be designated 14 and 15, said grooves of course being adapted to interengage with and maintain the clamping block 12 in position on the post 6 as shown in FIG. 1.

It will be noted further that the opening 13 is additionally provided with certain relieved areas such as wherein none of the ridges previously mentioned as denoted at 14 and 15 are present. This relieved area being designated 16 and oppositely thereto 17 in the clamping block 6.

It will thus be understood that when the clamping block is in the position of FIG. 2, the same is thus in an unlocked position so to speak or the adjusting position if desired, and thereby the block 12 may be moved in a straight line along the post 6 without interfering with the ridges formed on the post or the grooves formed in the block.

As a practical matter, the ridges and grooves may be respectively formed as tapping and threading, so that ease of manufacture is accomplished. Thus rotation of the clamping block 12 will move the same out of the thread engaging position which is the locked position and facilitate the movement previously mentioned and described in detail.

When it is desired to maintain the block in the position of FIG. 3 being the locked position, a suitable set screw such as 20 is manipulated and thus closes the slotted area 21 formed in the clamping block 12 for the purpose of facilitating a locking action as will be apparent.

The same identical locking interlocking arrangement is provided for the indicating arm designated 22, which is entered in an opening 23 formed identically to the opening 13 in the other portion of the clamping block 12, this opening 23 being at right angles as will be apparent with respect to the opening 13 previously mentioned.

Since the clamping interlocking positions are identical, the same kind of manipulation of the arm 22 may be resorted to to disengage the ridges formed thereon from the grooves in the clamping block 23 mating therewith normally so as to permit longitudinal movement of the arm 22 into a new position whereafter rotation of the arm again to the position shown in full lines in FIG. 1 will enable the locking of the arm as shown.

The various unlocked positions so to speak are further illustrated in the phantom disclosure in FIG. 1 as will be apparent where the respective parts are rotated with regard to one another so as to facilitate the longitudinal movement sought and obviously clamping action by a set screw for the indicating arm is likewise provided as well as the locking set screw 20 for the post connection of the clamping block therewith.

FIG. 1 discloses a suitable workpiece such as 25 as having been initially positioned on the machine table 1 and the indicating head 26 at the end of the indicating arm 22 is provided with a suitable element, a containing element, 27, to engage the workpiece 25 and determine that it is in the proper position for whatever operation is to be performed thereon.

It will be apparent that any workpiece which is similarly desired to be handled can likewise be positioned as desired in accordance with the use of the device as previously herein explained in detail.

I claim:

1. A stop gauge comprising a base, a post extending upwardly therefrom, a clamping block mounted on the post and an indicating arm extending from the said block having an indicating head at its extremity, the post being formed with means to interlock with the block in one position and the block having elements to interlock with the post in said position, swinging movement of the block from one position to another effecting disengagement of the means and elements to permit shifting of the block on the post to a different position for interlocking to maintain the block in said different position.

2. A stop gauge as claimed in claim 1, wherein the indicating arm has second means to interlock with second elements of the block to maintain the arm in one fixed position, rotation of the arm from said one position to another position effecting disengagement of the means and elements to permit shifting of the arm with respect to the block to a different position.

3. A stop gauge as claimed in claim 2, wherein rotation of the arm in said different position will effect interlocking of the second elements and second means.

4. A stop gauge as claimed in claim 1, wherein the post is formed with closely spaced circumferential ridges comprising the interlock means and opposed flattened areas extending therealong, and the clamping block is formed with mating grooves comprising the interlocking elements formed in an opening to receive said post, the opening grooves being discontinuous at areas to permit the ridges of the post and thereby the post, to move freely through the opening whenrotated, to the said another position.

5. A stop gauge as claimed in claim 1, wherein the post is formed with closely spaced circumferential ridges comprising the interlock means and opposed flattened areas extending therealong, and the clamping block is formed with mating grooves comprising the interlocking elements formed in an opening to receive said post, the opening grooves being discontinuous at areas to permit the ridges of the post and thereby the post, to move freely through the opening when rotated, to the said another position, subsequent rotation of the block in that position effecting interlocking of the block and post.

6. A stop gauge as claimed in claim 2, wherein the indicating arm is formed with closely spaced circumferential ridges and flattened areas extending therealong, the block is formed with mating grooves formed in an opening to receive said arm, the opening grooves being discontinuous at areas to permit the ridges of the arm and thereby the arm to move freely through the opening when rotated, to the said another position.

7. A stop gauge as claimed in claim 4, wherein the ridges and grooves are in the form of male and female threads respectively.

8. A stop gauge as claimed in claim 4, wherein the clamping block is provided with a second opening to receive an indicating arm, formed with similar interlock means and interlocking elements to facilitate free movement and locking positioning of said arm in the block.

* * * * *